United States Patent
Diehl et al.

(10) Patent No.: US 9,931,703 B2
(45) Date of Patent: *Apr. 3, 2018

(54) METHOD AND APPARATUS FOR CREATING A STARTING HOLE FOR MILLING IN A SURFACE OF A WORKPIECE BY A CNC MILLING MACHINE

(71) Applicants: TRUEMILL, INC., Thousand Oaks, CA (US); Bryan Diehl, Thousand Oaks, CA (US)

(72) Inventors: Alan Diehl, Westlake Village, CA (US); Robert B. Patterson, Bellevue, WA (US)

(73) Assignee: TRUEMILL, INC., Thousand Oaks, CA (US)

(*) Notice: Subject to any disclaimer, the term of this patent is extended or adjusted under 35 U.S.C. 154(b) by 190 days.

This patent is subject to a terminal disclaimer.

(21) Appl. No.: 14/980,911

(22) Filed: Dec. 28, 2015

(65) Prior Publication Data
US 2016/0107246 A1    Apr. 21, 2016

Related U.S. Application Data

(63) Continuation of application No. 12/972,691, filed on Dec. 20, 2010.

(60) Provisional application No. 61/288,431, filed on Dec. 21, 2009.

(51) Int. Cl.
*B23C 3/00* (2006.01)
*G05B 19/4093* (2006.01)

(52) U.S. Cl.
CPC .......... *B23C 3/00* (2013.01); *G05B 19/40937* (2013.01); *G05B 2219/36214* (2013.01); *G05B 2219/45145* (2013.01); *Y02P 90/265* (2015.11); *Y10T 409/30112* (2015.01); *Y10T 409/300896* (2015.01)

(58) Field of Classification Search
CPC ....................................................... G05B 19/18
USPC ........................... 409/80; 700/80; 219/69.17
See application file for complete search history.

(56) References Cited

U.S. PATENT DOCUMENTS

| | | |
|---|---|---|
| 4,619,079 A | 10/1986 | Kidani |
| 6,704,611 B2 | 3/2004 | Coleman et al. |
| 7,451,013 B2 | 11/2008 | Coleman et al. |
| 7,577,490 B2 | 8/2009 | Diehl et al. |
| 7,831,332 B2 | 11/2010 | Diehl |
| 7,951,010 B2 | 5/2011 | Muller |

(Continued)

OTHER PUBLICATIONS

Calculations of Chip Thickness and Cutting Forces in Flexible End Milling, M. Wan and W.H. Zhang, International Journal of Advanced Manufacturing Technology (2006) 29: 637-647.

*Primary Examiner* — Tejal Gami
(74) *Attorney, Agent, or Firm* — Panitch Schwarze Belisario & Nadel LLP

(57) ABSTRACT

A starting hole for milling in a surface of a workpiece by a CNC milling machine with a milling cutter mounted to a rotating spindle is created by milling a first hole at a first diameter to a first depth into the workpiece along the axis of the starting hole; and then successively milling a second hole at a second diameter to a second depth into the workpiece along the axis of the starting hole, wherein the second diameter is smaller than the first diameter. One or more additional holes may be successively milled to additional depths at successively smaller diameters.

20 Claims, 3 Drawing Sheets

(56) References Cited

U.S. PATENT DOCUMENTS

| | | | |
|---|---|---|---|
| 8,000,834 B2 | 8/2011 | Diehl et al. | |
| 2002/0195428 A1* | 12/2002 | Fischer | B23H 9/10 |
| | | | 219/69.17 |
| 2005/0061552 A1* | 3/2005 | Moore | E01C 23/0946 |
| | | | 175/385 |
| 2005/0256604 A1* | 11/2005 | Diehi | G05B 19/40937 |
| | | | 700/159 |
| 2007/0227278 A1 | 10/2007 | Tsou et al. | |
| 2007/0269282 A1* | 11/2007 | Agapiou | B23B 51/08 |
| | | | 409/64 |
| 2009/0317198 A1 | 12/2009 | Hanks et al. | |
| 2010/0008741 A1* | 1/2010 | Colombo | B23Q 1/012 |
| | | | 409/137 |
| 2011/0178629 A1 | 7/2011 | Diehl et al. | |
| 2011/0251715 A1 | 10/2011 | Diehl et al. | |

\* cited by examiner

METHOD AND APPARATUS FOR CREATING A STARTING HOLE FOR MILLING IN A SURFACE OF A WORKPIECE BY A CNC MILLING MACHINE

CROSS-REFERENCE TO RELATED APPLICATIONS

This application is a continuation of copending U.S. application Ser. No. 12/972,691 filed Dec. 20, 2010, which is incorporated by reference herein.

This application claims the benefit of U.S. Provisional Application No. 61/288,431, filed Dec. 21, 2009, the contents of which are incorporated herein by reference in their entirety.

BACKGROUND OF THE INVENTION

Field of the Invention

This invention relates to a computer aided manufacturing (CAM) process computer program that generates commands for use by a computer numerical control (CNC) milling machine, and more particularly, a computer program that generates commands for a CNC milling machine for forming a starting hole in a workpiece.

Background Information

The milling of an inside pocket in a surface of a workpiece by a vertical milling machine generally requires that a starting hole of preferably small diameter be first cut. The starting hole is cut using a material entry tool path which moves a cylindrical cutting tool in an axial direction, approximately perpendicular to the surface of the workpiece, from outside the workpiece, to a predetermined depth below the surface of the workpiece. After the cutting tool reaches the predetermined depth, a constant depth machining process in the horizontal plane typically commences for milling the pocket.

Two methods are commonly used to cut the starting hole. The first method uses a drill bit as the cutting tool. The material entry tool path is in the direction of the axis of the drill bit. Following the forming of the starting hole, a milling cutter of smaller diameter than the starting hole is fed into the starting hole in order to start the milling in the horizontal plane. Disadvantageously, drill bits suitable for drilling in metal have pointed ends, thus requiring the starting hole to be cleaned out by an extra milling operation before constant depth milling in the horizontal plane can commence. A further disadvantage of using a drill bit for a starting hole is that the drill bit must be exchanged for a milling cutter before horizontal milling for cutting a pocket can be initiated.

A second, and more recent method of forming a starting hole, uses an end mill. An end mill typically includes on its side, two or more helical shaped blades, called teeth, which have sharp cutting edges. The blades or teeth are separated by recessed helical grooves called flutes. Typically, the bottom or end of the end mill also contains two or more blades or teeth with sharp cutting edges. Consequently, an end mill can cut material on it's sides, by moving in horizontal direction relative to axis of the end mill, or can cut material on it's end, by moving in a direction of the axis of the end mill. With simultaneous motion in horizontal and axial directions, an end mill cuts with portions of both its side and bottom cutting edges.

Forming a starting hole with an end mill generally involves a material entry tool path having a helix-like shape, i.e. a helix whose radii may vary as a function of angle and/or depth, that advances into the workpiece in a direction generally perpendicular to the surface of the workpiece. If the helix is circular of constant radius, as is usual in the prior art, a single hole having a constant radius that is equal to the radius of the helix plus the radius of the cutting tool is formed to the desired depth of the first horizontal milling operation. By using an end mill in a helix-like tool path to form the starting hole, the bottom of the starting hole is flat and the milling cutter need not be changed to initiate the horizontal milling process for cutting the pocket.

The use of an end mill in a material entry toolpath is not without problems. During a machining process with an end mill, thin chips of material are cut, sheared or shorn from the workpiece. If the chips are not sufficiently evacuated from the work piece during the cutting process, they interfere with the cutting action of the tool by jamming between the cutting edges of the milling cutter and the work piece. The problem is exacerbated during the forming of starting hole because the preferably small diameter of the starting hole provides only a limited space for the chips to move away from the tool. While at shallow depths, the chips created by a helix-like tool path can escape relatively easily through the open space along the flutes of the milling cutter. However, as the depth of cut increases, friction between the chips, the walls of the work piece and the flutes, increases to a point where chips start to be packed together. Consequently, it becomes increasingly more difficult for the accumulation of chips to be evacuated through the space between the flutes as the depth of the starting hole is made larger. Beyond a certain depth of cut, some chips get caught and squeezed between the cutting edges of the tool and the wall of the region from which material has already been removed. At some point, the chips can become so tightly packed that the milling cutter is forced to re-cut them. This re-cutting interferes with the normal cutting action of the end mill in that some chips actually wedge between the cutting edge of the milling cutter and the work piece. This wedging action damages the milling cutter's cutting edge by causing small chips in the coating of a carbide milling cutter. Too many such small chips in the cutting edge can cause tool failure and possible breakage of the milling cutter. In softer materials, such as aluminum, the friction can cause the squeezed chips to rapidly heat to the melting point and become welded to the milling cutter, completely compromising its cutting ability and leading to failure or breakage of the milling cutter.

Prior art CAM software typically mills pockets by a succession of shallow horizontal milling operations in which the depth of each cut is less than one-half the diameter of the milling cutter. Such shallow cutting depths generally avoid the problem of chip re-cutting. The disadvantage of this method is that several cuts at shallow depths are required to get down to the desired depth of the pocket.

Recent advances in CAM software for controlling CNC milling machines, such as Truemill®, made by Surfware, Inc., allows the depth of each horizontal milling cut for forming a pocket to be at least as great as twice the diameter of the milling cutter, thus increasing the removal rate of material. However, forming a starting hole with a milling cutter to such depths using known material entry tool paths frequently results in excessive tool wear and possible tool breakage.

In consideration of the above, it would be desirable to have a material entry tool path that would allow for machining a starting hole having a depth of at least twice the diameter of a milling cutter and still avoid the problem of having chips of material accumulating between the cutting edges of the tool and the walls of the region from which material has already been removed.

BRIEF SUMMARY OF THE INVENTION

Briefly stated the present invention is a method of generating control code for a CNC machine comprising the steps of: generating in a computer a first plurality of coordinate values, $x_i$, $y_i$, $z_i$, said first plurality of coordinate values representing a plurality of first connected line segments which surround a vertical axis, said first connected line segments gradually descending to a first predetermined depth, generating in a computer a second plurality of coordinate values $x_j$, $y_j$, $z_j$, said second plurality of coordinate values representing a plurality of second connected line segments which surround the vertical axis, said plurality of second connected line segments having a starting point at approximately the first predetermined depth, and gradually descending to a second predetermined depth greater than the first depth, and converting the first and the second coordinate values to a code for controlling the CNC machine, wherein, when said code is executed in said CNC machine, a milling cutter mounted to a spindle of the CNC machine forms in a workpiece, a first hole based on the first plurality of coordinate values and a second hole based on the second plurality of coordinate values such that a ledge having a width greater than a chip thickness is formed in the workpiece at a boundary of the first hole and the second hole.

In another aspect, the present invention comprises an apparatus for generating control code for a CNC machine comprising: an arithmetic processor coupled to a memory, wherein the processor is programmed to generate the control code by: generating in a computer a first plurality of coordinate values, $x_i$, $y_i$, $z_i$, said first plurality of coordinate values representing a plurality of first connected line segments, said first connected line segments which surround a vertical axis gradually descending to a first predetermined depth, generating in a computer a second plurality of coordinate values $x_j$, $y_j$, $z_j$, said second plurality of coordinate values representing a plurality of second connected line segments which surround the vertical axis, said plurality of second connected line segments having a starting point at approximately the first predetermined depth, and gradually descending to a second predetermined depth greater than the first depth, and converting the first and the second coordinate values to a code for controlling the CNC machine, wherein, when said code is executed in said CNC machine, a milling cutter mounted to a spindle of the CNC machine forms in a workpiece, a first hole based on the first plurality of coordinate values and a second hole based on the second plurality of coordinate values such that a ledge having a width greater than a chip thickness is formed in the workpiece at a boundary of the first hole and the second hole.

In a further aspect, the present invention comprises a non-transitory computer readable storage medium with an executable program stored thereon, wherein the program instructs an arithmetic processor to perform the following steps: generating in a computer a first plurality of coordinate values, $x_i$, $y_i$, $z_i$, said first plurality of coordinate values representing a plurality of first connected line segments which surround a vertical axis, said first connected line segments which surround the vertical axis gradually descending to a first predetermined depth, generating in a computer a second plurality of coordinate values $x_j$, $y_j$, $z_j$, said second plurality of coordinate values representing a plurality of second connected line segments which surround the vertical axis, said plurality of second connected line segments having a starting point at approximately the first predetermined depth, and gradually descending to a second predetermined depth greater than the first depth, and converting the first and the second coordinate values to a code for controlling the CNC machine, wherein, when said code is executed in said CNC machine, a milling cutter mounted to a spindle of the CNC machine forms in a workpiece, a first hole based on the first plurality of coordinate values and a second hole based on the second plurality of coordinate values such that a ledge having a width greater than a chip thickness is formed in the workpiece at a boundary of the first hole and the second hole.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
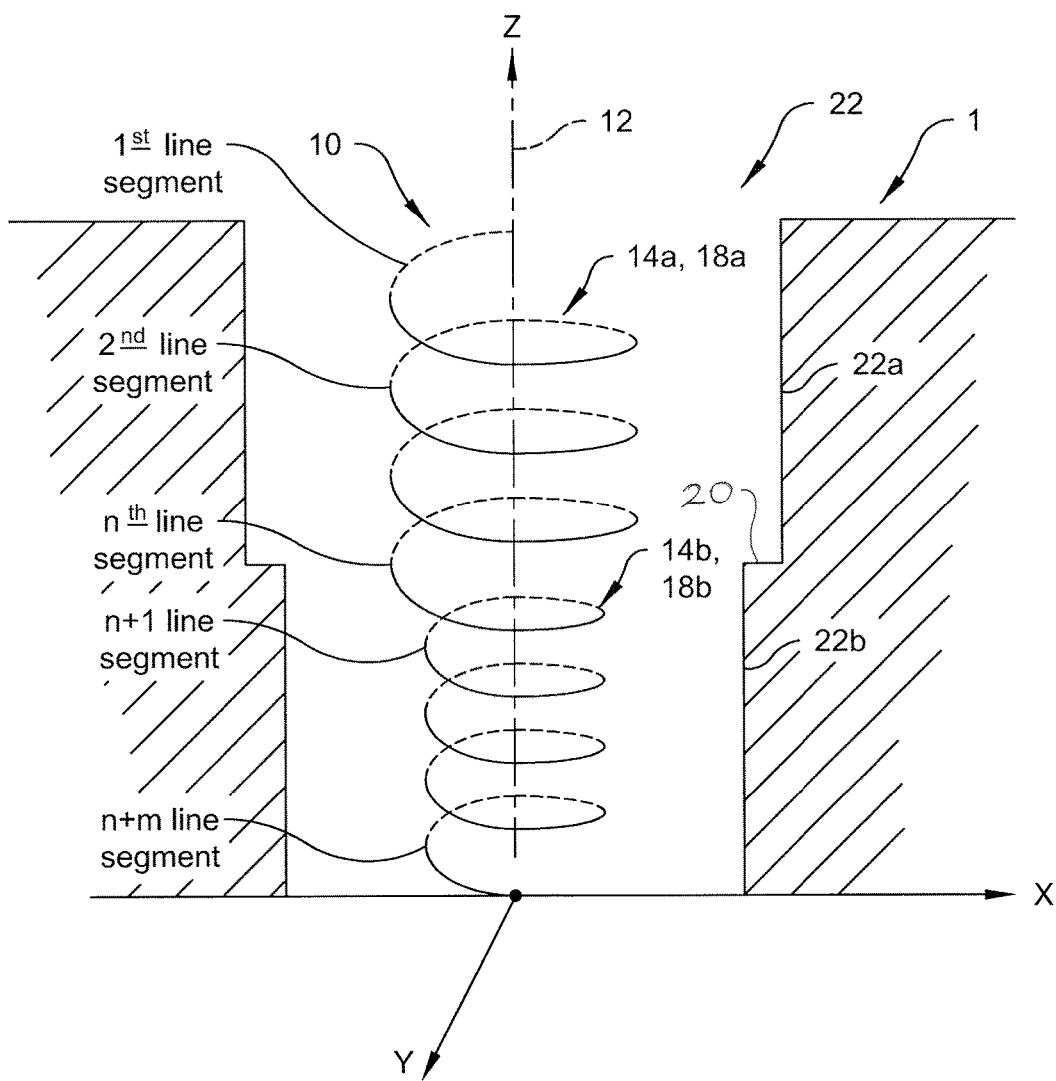
FIG. 1 is a diagram of a tool path for milling a starting hole in a workpiece in accordance with a preferred embodiment of the invention.

Certain terminology is used in the following description for convenience only and is not limiting. In this application, the term vertical refers to a direction parallel to the axis of rotation of the milling cutter, collet and spindle of a CNC machine and the term horizontal refers to a direction normal to the axis of rotation of the milling cutter regardless of the actual orientation of the CNC machine. In terms of a Cartesian coordinate system, the Z direction is parallel to the vertical plane and the X and Y directions are parallel to the horizontal plane. The term descending refers to movement in the −Z direction. The terminology includes the above-listed words, derivatives thereof and words of similar import.

In view of the problems identified in the Background Section, the following experiments were conducted:

EXPERIMENT 1

Starting holes were milled in a titanium workpiece with a one-half inch diameter end mill using a circular helix tool path of constant diameter slightly less than the diameter of the end mill. A rumbling of the milling machine was observed to occur when the depth of the milling cutter in the workpiece exceeded the diameter of the end-mill. It was determined that the rumbling was the result of the chips cut by the milling cutter being re-cut due to the chips not being fully evacuated from the starting hole as the milling cutter descended into the workpiece.

EXPERIMENT 2

Starting holes were milled in a titanium workpiece with a one-half inch diameter end mill using a circular helix tool path of smoothly decreasing radius, with the notion that the chips would be evacuated from the hole due to the diameter of the hole above the actual cutting plane at the end of the end mill being large compared to the diameter of the hole at the cutting plane. It was determined that a starting hole cut with a circular helix tool path of smoothly decreasing radius did not allow for the starting hole to be cut substantially deeper than a hole cut using a helix tool path of constant radius before chip re-cutting occurred.

EXPERIMENT 3

Starting holes were milled using a one-half inch diameter end mill. A first hole was milled at a first diameter to a depth of about the diameter of the milling cutter using a circular helix tool path. The starting hole was made deeper using the milling cutter to mill successive concentric holes, each having a smaller diameter than the preceding hole. The amount that each successive hole was made smaller was varied to determine if a hole could be milled to a depth of twice the diameter of the milling cutter without substantial re-cutting of the chips. It was determined that if the diameter of each successive hole was made smaller by about twice the diameter of the chip thickness, successive holes of deceasing depth could be milled such that the starting hole could have a depth of at least twice the diameter of the milling cutter without substantial re-cutting of the chips. The results obtained in Experiment 3 are shown in Table 1.

TABLE 1

| | | Material | | | | |
|---|---|---|---|---|---|---|
| | Cutter Diameter | $1^{st}$ Depth | Step-in | $2^{nd}$ Depth | Step-in | $3^{rd}$ Depth | Total Depth |
| Titanium | 0.5 in | 0.55 in | .005 in | .33 in | .005 in | .22 in | 1.1 in |

Referring now to FIG. 1, there is shown a tool path 10 of a milling cutter cutting a starting hole 22 in a workpiece 1 according to a preferred embodiment of the invention. The tool path 10 is generated by: (1) generating with a computer, a first plurality of coordinate values $x_i$, $y_i$, $z_i$ 14a, where the first coordinate values 14a represent a plurality of first connected line segments 18a, 1 to n, which surround a vertical axis 12, which gradually descend in the "z" direction to a first predetermined depth; (2) generating with a computer, a second plurality of −coordinate values $x_j$, $y_j$, $z_j$ 14b, where the second coordinate values 14b represent a plurality of second connected line segments 18b, n+1 to n+m, which surround the vertical axis 12, and which gradually descend in the "z" direction to a second predetermined depth, and where the second predetermined depth is greater than the first predetermined depth. The tool path 10 is such that when the first coordinate values 14a and the second coordinate values 14b are converted to a code for controlling a CNC machine, and when the code is executed in the CNC machine, a milling cutter mounted to a spindle of the CNC machine forms in the workpiece 1, a first hole 22a based on the first plurality of coordinate values 14a and a second hole 22b based on the second plurality of coordinate values 14b such that a ledge 20 having a width preferably greater than a chip thickness is formed in the workpiece at a boundary of the first hole 22a and the second hole 22b.

The chip thickness resulting from a helix tool path is a function of the pitch of the helix, the feed rate of the milling cutter and the rotational speed of the milling cutter and is determinable by known methods such as that described in the paper, *Calculations Of Chip Thickness And Cutting Forces In Flexible End Milling*, M. Wan and W. H. Zhang, International Journal of Advanced Manufacturing Technology (2006) 29: 637-647, which is hereby incorporated in its entirety.

In the preferred embodiment, the first coordinate values 14a and the second coordinate values 14b are determined by the equations of a helix, where the first coordinate values, $x_i$, $y_i$, and $z_i$, correspond to a first curve in space in accordance with:

$$x_i = a \cos t_i + x_0$$

$$y_i = b \sin t_i + y_0$$

$$z_i = -c_1 t_i + z_0;\text{ and}$$

the second coordinate values, $x_j$, $y_j$, $z_j$, correspond to a second curve in space in accordance with:

$$x_j = (a-s)\cos t_j + x_0$$

$$y_j = (b-s)\sin t_j + y_0$$

$$z_j = -(2pc_1 + c_2 t_j) + z_0,$$

where $0 \leq t_i \leq 2p$, $0 \leq t_j \leq 2p$, $0 \leq s \leq a$, b, and s is greater than the chip thickness.

However, the first and the second coordinate values 14a, 14b need not be computed from the equations of a helix as long as the coordinate values 14a, 14b result in smoothly connected line segments 18a, 18b which gradually descend in the direction of the Z axis.

In the preferred embodiment, the first connected line segments 18a and the second connected line segments 18b are such that they form holes of circular cross section, as would be the result of the parameter "a" being equal to the parameter "b". However, in other embodiments, the first and the second holes 22a, 22b need not be of circular cross section. For example, if the parameter "a" was not equal to the parameter "b", the cross section of each hole 22a, 22b would be an ellipse.

Also, the first and the second coordinate values 14a, 14b and the resulting line segments 18a, 18b need not be exclusively arcs. In another preferred embodiment, each line segment 18a, 18b comprises two arcs, and two straight lines which connect the ith line segment with the i+1 line segment and the i−1 line segment so as to form a slot like cross-section of each hole 22a, 22b.

Further, the cross-section of the first and the second holes 22a, 22b need not be geometrically similar. That is for example, the first hole 22a could be circular in cross-section and the second hole 22b could be triangular in cross-section. Such configuration would be suitable provided that at least a portion of the ledge 20 was greater than a chip thickness.

While in the preferred embodiment, the number of successive holes 22a, 22b whose cross-section dimensions successively decrease are two, the number of holes having a decreasing cross-section dimension is not limited to two holes 22a, 22b but could be three, as for example in experiment 3, or could be greater than three.

In the preferred embodiment, the depth of the first hole 22a is less than the diameter of the milling cutter, and the diameter of the second hole 22b and each succeeding hole (not shown) is made successively smaller. However, in some cases, the depth of the first hole 22a could be larger than the diameter of the milling cutter depending on type of material, the type of the end mill, the surface speed of the end mill flutes and the chip load per tooth. In practice, the optimum depth of the first hole 22a, the second hole 22b, and each succeeding hole would be determined by a machinist performing a test cut or cuts in the material to be used for the workpiece.

Figure 2:
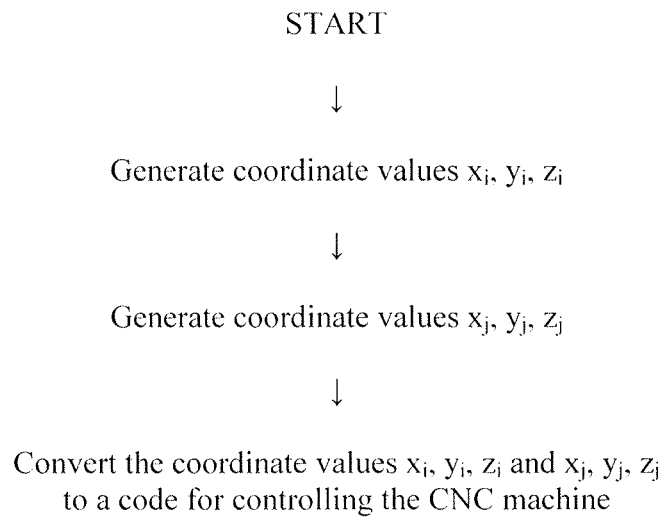
FIG. 2 is a flowchart showing one preferred embodiment of the present invention.

FIG. 2 shows a self-explanatory flowchart of the steps for performing one preferred embodiment of the present invention.

Figure 3:
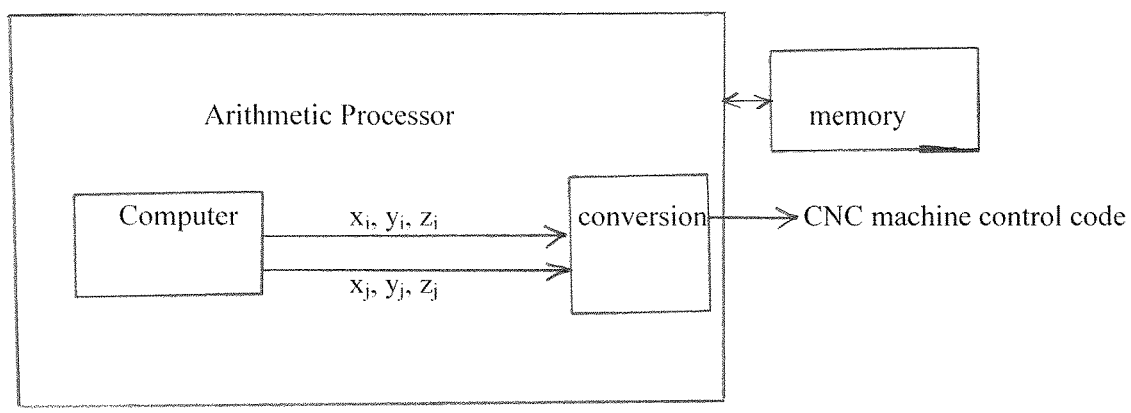
FIG. 3 is a schematic diagram showing one preferred embodiment of the present invention.

FIG. 3 shows a self-explanatory schematic diagram of an apparatus for performing one preferred embodiment of the present invention.

Preferably the computer used for generating the control code is a programmable type of computer of a kind commonly called a personal computer. Preferably, the computer employs one or more arithmetic processor chips, a random access memory, non-volatile memory such as semiconductor read only memory, a hard disk, removable read/write memory drives such as a floppy disk drive and/or CD disk drive, a paper tape and/or a magnetic tape drive, a keyboard, a mouse, and a video display. Preferably, the computer utilizes the Windows™ software operating system manufactured by. Microsoft Corporation.

Preferably, the code for execution in the CNC machine is transferred from the computer to the CNC machine using one of any well known wire or wireless interface standards. Alternatively, the code may be recorded on a removable media such as a floppy disk, a CD disk, a flash memory stick, a magnetic tape or a paper tape, for transfer to the CNC machine. However, the computer program is not required to be generated by the aforementioned hardware and software environment. Alternatively, for example, the computer program for generating the code for the CNC machine could be generated within the computer of the CNC machine.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of creating a starting hole for milling in a surface of a workpiece by a CNC milling machine with a milling cutter mounted to a rotating spindle, the method comprising:
   (a) milling a first hole at a first diameter to a first depth into the workpiece along the axis of the starting hole; and
   (b) successively milling a second hole at a second diameter to a second depth into the workpiece along the axis of the starting hole, wherein the second diameter is smaller than the first diameter, wherein the starting hole always includes milling the first hole and the second hole, and wherein the diameter of the milling cutter is less than the diameter of the first hole and the second hole.

2. The method of claim 1 wherein the CNC milling machine has a milling cutter, and wherein the first depth is about the diameter of the milling cutter.

3. The method of claim 2 wherein the starting hole is milled to a depth of at least twice the diameter of the milling cutter.

4. The method of claim 1 further comprising:
   (c) successively milling one or more additional holes to additional depths at successively smaller diameters.

5. The method of claim 4 wherein the successively milled holes have successively smaller depths.

6. The method of claim 1 wherein a ledge is formed in the workpiece at a boundary between the first hole and the second hole.

7. The method of claim 6 wherein the milling cutter creates chips when forming the starting hole, and wherein the ledge has a width greater than a thickness of the chips.

8. The method of claim 1 wherein the second hole is concentric with the first hole.

9. The method of claim 1 wherein the CNC milling machine is a vertical milling machine.

10. The method of claim 1 wherein the second depth is smaller than the first depth.

11. An apparatus for generating control code for a CNC milling machine such that when the control code is executed in the CNC milling machine, a milling cutter mounted to a rotating spindle of the CNC milling machine forms in a workpiece a starting hole for milling in the surface of the workpiece, the apparatus comprising a processor programmed to generate control code that:
   (a) mills a first hole at a first diameter to a first depth into the workpiece along the axis of the starting hole; and
   (b) successively mills a second hole at a second diameter to a second depth into the workpiece along the axis of the starting hole, wherein the second diameter is smaller than the first diameter, wherein the starting hole always includes milling the first hole and the second hole, and wherein the diameter of the milling cutter is less than the diameter of the first hole and the second hole.

12. The apparatus of claim 11 wherein the CNC milling machine has a milling cutter, and wherein the first depth is about the diameter of the milling cutter.

13. The apparatus of claim 12 wherein the starting hole is milled to a depth of at least twice the diameter of the milling cutter.

14. The apparatus of claim 11 wherein the processor is further programmed to generate control code that:
   (c) successively mills one or more additional holes to additional depths at successively smaller diameters.

15. The apparatus of claim 14 wherein the successively milled holes have successively smaller depths.

16. The apparatus of claim 11 wherein a ledge is formed in the workpiece at a boundary between the first hole and the second hole.

17. The apparatus of claim 16 wherein the milling cutter creates chips when forming the starting hole, and wherein the ledge has a width greater than a thickness of the chips.

18. The apparatus of claim 11 wherein the second hole is concentric with the first hole.

19. The apparatus of claim 11 wherein the CNC milling machine is a vertical milling machine.

20. The apparatus of claim 11 wherein the second depth is smaller than the first depth.

* * * * *